(12) United States Patent
Sevindik et al.

(10) Patent No.: US 10,771,956 B1
(45) Date of Patent: Sep. 8, 2020

(54) SUBSCRIBER IDENTIFICATION MODULE (SIM) TASK SCHEDULER FOR DUAL SIM DEVICES USING CITIZENS BROADBAND RADIO SERVICE NETWORK

(71) Applicant: Charter Communications Operating, LLC, St. Louis, MO (US)

(72) Inventors: Volkan Sevindik, Parker, CO (US); Haider Syed, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/736,006

(22) Filed: Jan. 7, 2020

Related U.S. Application Data

(62) Division of application No. 16/441,607, filed on Jun. 14, 2019, now Pat. No. 10,623,943.

(51) Int. Cl.
  *H04W 8/18* (2009.01)
  *H04W 48/16* (2009.01)
  *H04B 17/318* (2015.01)
  *H04W 48/18* (2009.01)
  *H04W 88/06* (2009.01)

(52) U.S. Cl.
  CPC .......... *H04W 8/183* (2013.01); *H04B 17/318* (2015.01); *H04W 48/16* (2013.01); *H04W 48/18* (2013.01); *H04W 88/06* (2013.01)

(58) Field of Classification Search
  CPC ....... H04W 8/18; H04W 8/245; H04W 8/005; H04W 8/08; H04W 8/183
  See application file for complete search history.

(56) References Cited

U.S. PATENT DOCUMENTS

| | | | |
|---|---|---|---|
| 1,063,943 A * | 6/1913 | Ptacek-Bird | B60G 21/04 280/104 |
| 9,985,771 B2 | 5/2018 | Olufunmilola et al. | |
| 2011/0117965 A1 | 5/2011 | Gong et al. | |
| 2015/0245309 A1 | 8/2015 | Nayak et al. | |
| 2015/0327159 A1 | 11/2015 | Gude et al. | |
| 2018/0184414 A1 | 6/2018 | Smith et al. | |
| 2019/0364492 A1 * | 11/2019 | Azizi | H04W 48/10 |
| 2020/0028745 A1 | 1/2020 | Parkvall et al. | |

* cited by examiner

*Primary Examiner* — Diane D Mizrahi
(74) *Attorney, Agent, or Firm* — Young Basile Hanlon & MacFarlane, P.C.

(57) ABSTRACT

A subscriber identification module (SIM) level task scheduler is described. A dual SIM device SIM radio controller determines quality of service (QoS) levels for each service running on a dual SIM device. A first SIM and radio are connected to one of an unlicensed spectrum network or a licensed spectrum network, which are operated by a same service provider. A second SIM and radio scan for available network connections operated by the service provider. The dual SIM device measures QoS levels and the controller checks them against QoS requirements. The controller instructs the second radio to connect to a selected network from the available networks when the measured QoS levels are at least steadily degrading. The dual SIM device shares and negotiates the first radio settings with the selected network. The controller instructs a processor to switch from the first to the second radio when the selected network is ready.

20 Claims, 8 Drawing Sheets

SUBSCRIBER IDENTIFICATION MODULE (SIM) TASK SCHEDULER FOR DUAL SIM DEVICES USING CITIZENS BROADBAND RADIO SERVICE NETWORK

CROSS REFERENCE TO RELATED APPLICATION

This application is a divisional of U.S. patent application Ser. No. 16/441,607, filed on Jun. 14, 2019, the entire content of which is incorporated by reference.

TECHNICAL FIELD

This disclosure relates to wireless communications. More specifically, this disclosure relates to task management using a subscriber identification module (SIM) level task scheduler when operating with Citizens Broadband Radio Service systems.

BACKGROUND

Wireless telecommunications or radio access technologies (RATs) generally use licensed radio frequency spectrum for communications between mobile devices and wireless telecommunications networks. For example, licensed spectrum and unlicensed spectrum may be used for third generation (3G) and fourth generation (4G) wireless communications.

Citizens Broadband Radio Service (CBRS) spectrum is a type of unlicensed spectrum or shared spectrum which is shared between multiple entities including government users (such as the military), licensed users, and non-licensed users. CBRS is a multi-tiered wireless band between 3.550 MHz and 3.700 MHz. In particular, CBRS is a three-tiered access framework including incumbent users (i.e., federal, military, and the like), priority access users (winning auction bidders), and general authorized access users, where the general users are permitted to use any portion of the CBRS spectrum not assigned to a higher tier user and may also operate opportunistically on unused priority access spectrum. Availability of CBRS spectrum dynamically changes depending on use by higher priority entities. Higher tier users are protected from lower tier users using a centralized spectrum access system (SAS), which may be a federal or commercial entity. The SAS authorizes or grants spectrum to access points known as CBRS Devices (CBSDs) and performs interference management to protect higher tier users. This protection may include, for example, dropping CBSDs which are general authorized access users. In summary, CBRS is an interference limited network which means that the performance of the network and the data sent to CBRS subscribers is limited by the amount of interference the CBRS users or subscribers experience in the frequency band of operation.

Dual subscriber identification module (SIM) devices are mobile devices which may simultaneously connect to networks using the licensed spectrum and the unlicensed spectrum. Consequently, a processor in the dual SIM devices may need to perform tasks related to both connections in addition to other radio resource management tasks and user performance may suffer. For example, this may become critical when a quality of service in the unlicensed spectrum based network is degrading and seamless transition to the licensed spectrum based network is required.

SUMMARY

Disclosed herein are methods and systems using a subscriber identification module (SIM) level task scheduler. The method may include determining, by a SIM radio controller on a dual SIM device, quality of service (QoS) levels for each service running on a dual SIM device, where a first SIM and first radio is connected to a first network and where the first network is one of an unlicensed spectrum network or a licensed spectrum network. Both the unlicensed spectrum network and the licensed spectrum network being operated by a service provider. A second SIM and second radio scan for available network connections which are operated by the service provider. The dual SIM device measures QoS levels for each service and the SIM radio controller checks the measured QoS levels against required QoS levels. The dual SIM device remains on the first network if the measured QoS levels at least meet the required QoS levels. The SIM radio controller also determines if the measured QoS levels are steadily degrading. The SIM radio controller instructs the second radio to connect to a selected network from the available networks when the measured QoS levels are steadily degrading or the measured QoS levels are below the required QoS levels. The dual SIM device shares and negotiates the first radio settings with the selected network. The SIM radio controller instructs a processor to switch from the first radio to the second radio when the selected network indicates transmission readiness.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
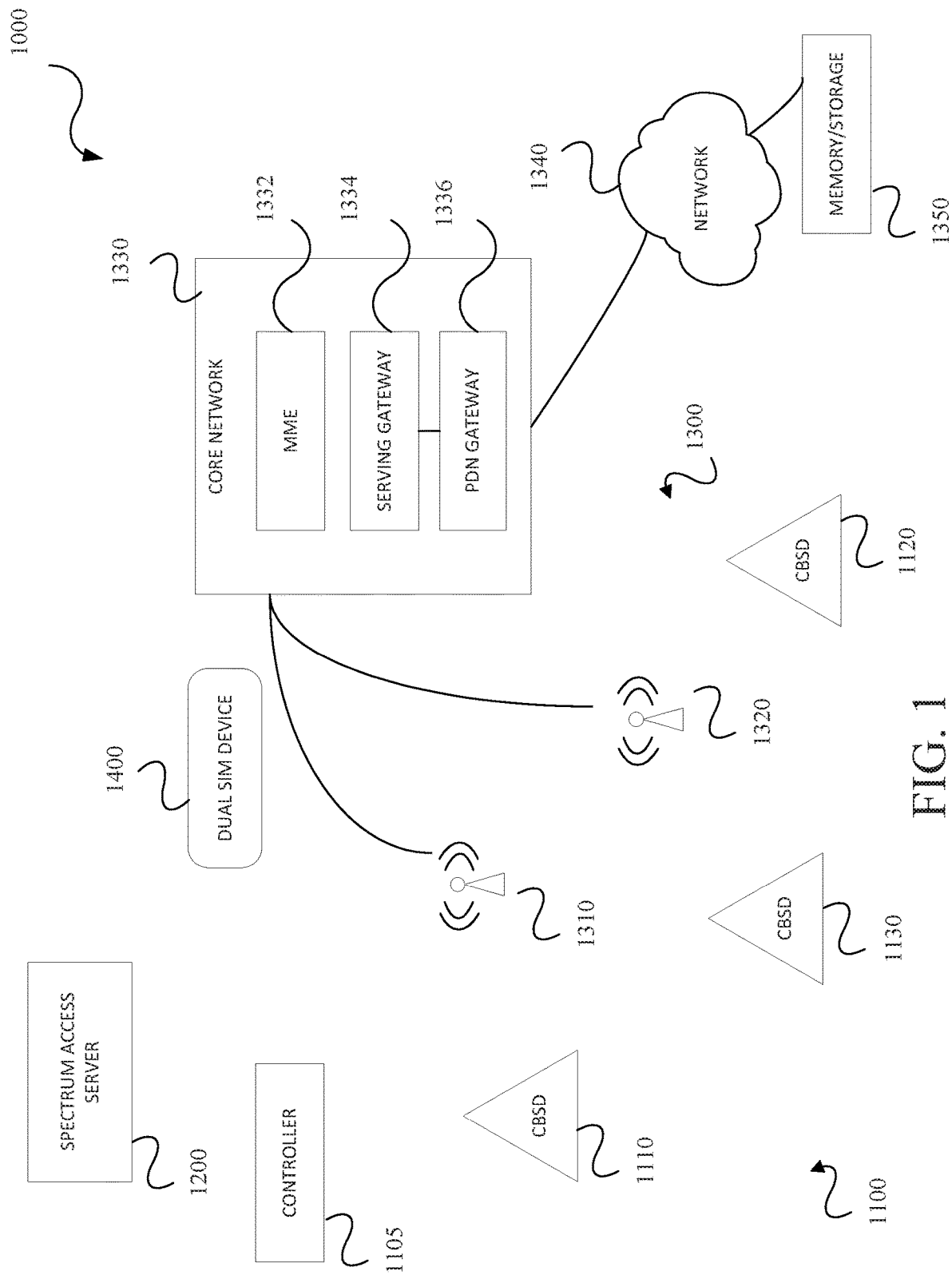
FIG. 1 is a diagram of an example of a citizens broadband radio service (CBRS) network and a licensed spectrum with dual subscriber identification module (SIM) devices in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Disclosed herein are methods and systems using a subscriber identification module (SIM) level task scheduler or SIM radio controller when dual SIM devices are connected to a network using unlicensed spectrum and/or a network using licensed spectrum. In an implementation, the unlicensed spectrum may be a Citizens Broadband Radio Service (CBRS) spectrum which is controlled by a spectrum access system (SAS). The SIM level task scheduler may make real-time decisions on which network to measure, which network to connect to, network security issues, and determine dual SIM device capabilities. In an implementation, the SIM level task scheduler may be implemented in one SIM of the dual SIM device. In an implementation, the SIM level task scheduler may run as part of the dual SIM device operating system. In an implementation, the SIM level task scheduler may run as part of the kernel software on the dual SIM device. In an implementation, the SIM level task scheduler may be provided on the dual SIM device as firmware. The method may improve user experience when using the CBRS spectrum for data and voice connectivity and communications. For example, this may prevent a user from being disconnected or experiencing a degraded level of quality of service (QoS).

In an implementation, a service provider may provision the dual SIM device with one SIM for operation with unlicensed spectrum and one SIM for operation with licensed spectrum. The unlicensed spectrum SIM may be associated with the service provider and the licensed spectrum SIM may be associated with another service provider, however, both the unlicensed spectrum SIM and the licensed spectrum SIM may be operated by the service provider. As a result, the service provider is able to provide a seamless QoS switching to the user if the unlicensed spectrum connection becomes degraded or untenable.

In an implementation, the SIM level task scheduler may scan available networks including CBRS Devices (CBSD) and base stations, connect to a network based on a set of parameters, run voice and data applications, and manage paging and network messages. In an implementation, the set of parameters may include signal strength of network, available capacity of network, number of users in network, and required QoS for data, voice, and other applications. QoS negotiations are completed prior to switching network connections and are switched during an idle period so that the user retains connectivity and functionality at the pending QoS level.

In an implementation, the SIM level task scheduler may proactively check a current network connection and potential connections to ensure connectivity and QoS performance. An inventory of services may be created and a QoS may be determined for each service. If the QoS starts degrading over a period of time, the SIM level task scheduler may then check the potential connections for a suitable match by comparing QoS, strength of schedule, and other factors. If a suitable match is determined, the SIM level task scheduler may instruct the other unconnected SIM and radio to negotiate with the new network with respect to settings, QoS, and the like. Once negotiations are completed, the new network may obtain data from Internet and cache on associated base station. In this transition period, the dual SIM device may be connected to two networks but the processor may only be processing data from the current network. Once new network is ready and at an idle time, the SIM level task scheduler may instruct processor to switch to the other SIM and radio and the processor may start processing data from the new network.

FIG. 1 is a diagram of an example architecture 1000 for task management using a SIM level task scheduler when dual SIM devices connect and communicate in unlicensed spectrum and licensed spectrums networks operated by a service provider. In an implementation, the architecture 1000 may include a CBRS network 1100 which may provide wireless coverage. The CBRS network 1100 may include CBSDs 1110, 1120, and 1130. In an implementation, the CBSDs 1110, 1120, and 1130 may form a cluster that may be controlled by a controller 1105. The number of clusters and the number of CBSDs is illustrative and the architecture 1000 may include more or less clusters and each cluster may include more or less CDSDs. The architecture 1000 may include a SAS 1200 which is connected to or in communication (collectively "in communication with") with each of the CBSDs 1110, 1120, and 1130, or the controller 1105 when appropriate.

In an implementation, the architecture 1000 may include a licensed spectrum network 1300 which may provide wireless coverage. The licensed spectrum network 1300 may include base stations 1310 and 1320. The number of base stations is illustrative and the architecture 1000 may include more or less base stations. The 1310 and 1320 may be in communication with a core network 1330, which may include a mobility management entity (MME) 1332, a serving gateway 1334, and a packet data network (PDN) gateway 1336. The core network 1330 may be in communication with a network 1340, which may include at least the Internet, and which may in communication with a memory/storage 1350.

A dual SIM device 1400 may be in communication with one of the CBSDs 1110, 1120, and 1130, and/or one of the base stations 1310 and 1320. The communications between the dual SIM device 1400, particular CBSDs 1110, 1120, and 1130, the SAS 1200, the controller 1105 when applicable, particular base stations 1310 and 1320, the core network 1330, the network 1340, and the memory/storage 1350, as appropriate and applicable, may include wired communications, wireless communications, or a combination thereof. In an implementation, the architecture 1000 may execute the techniques described in FIGS. 7 and 8. The architecture 1000 is illustrative and may include additional, fewer or different devices, entities and the like which may be similarly or differently architected without departing from the scope of the specification and claims herein. Moreover, the illustrated devices may perform other functions without departing from the scope of the specification and claims herein.

The CBSDs 1110, 1120, and 1130 may be a base station, an access point, an access node or like device which enables radio communications access between, for example, the dual SIM device 1400 to other devices. Each CBSD 1110, 1120, and 1130 may be authorized and granted spectrum allocation by the SAS 1200 (which may be communicated via the controller 1105, for example, in an implementation). Each CBSD 1110, 1120, and 1130 may have sectors which provide wireless communications coverage.

The base stations 1310 and 1320 may be a node-B, an evolved node-B, an access point, an access node or like device which enables radio communications access between, for example, the dual SIM device 1400 to other devices. Each base station 1310 and 1320 may have sectors which provide wireless communications coverage.

In an implementation, the CBSDs 1110, 1120, and 1130 may be owned and operated by the service provider, and the base stations 1310 and 1320 may be owned by a multiple systems operator and may be operated by the service provider. That is, the CBRS network 1100 and the licensed spectrum network 1300 may be operated by the same service provider.

The dual SIM device 1400 may be, but is not limited to, end user devices, cellular telephones, Internet Protocol (IP) devices, mobile computers, laptops, handheld computers, PDAs, personal media devices, smartphones, notebooks, notepads, phablets and the like which may include two (2) SIMs and at least one radio. One SIM of the dual SIM device 1400 may be provisioned for operation with the CBRS network 1100 and the other SIM may be provisioned for operation with the licensed spectrum network 1300. In an implementation, the CBRS network provisioned SIM of the dual SIM device 1400 may include a SIM level task scheduler or SIM controller which may perform task scheduling for the dual SIM device 1400 as described herein. For example, the SIM level task scheduler or SIM controller may make real-time decisions on which network to measure, which network to connect to, QoS determinations, network security issues, determine dual SIM device capabilities, and control SIM switching between the CBRS network 1100 and the licensed spectrum network 1300 when QoS or security issues prompt such switching. In an implementation, the dual SIM device 1400 may include a SIM level task scheduler or SIM controller which may perform task scheduling for the dual SIM device 1400 as described herein. The SIM level task scheduler or SIM controller may be implemented as a combination of software and firmware on the dual SIM device 1400 as described herein which may control both SIMS on the dual SIM device. In an implementation, the SIM level task scheduler or SIM controller may communicate with other SIM level task schedulers or SIM controllers using messaging or out-of-band signaling.

The SAS 1200 enables access to the CBRS spectrum and dynamically manages the spectrum for optimal use, efficiency, and compliance with CBRS rules. The SAS 1200 communicates with each CBSD for registration, grant allocation/deallocation and interference management. The SAS 1300 may perform interference analysis based on power measurements.

Operationally, and as described in detail herein below, the SAS 1200 may grant spectrum to each activated CBSD, such as the CBSDs 1110, 1120, and 1130 and may establish a wireless coverage of CBRS network 1100. In an implementation, the communication may be via the controller 1105. Base stations 1310 and 1320 may establish a wireless coverage of licensed spectrum network 1300.

A dual SIM device, i.e., the dual SIM device 1400 may be connected to a CBSD such as CBSDs 1110, 1120, and 1130 using a first radio, for example. A SIM level task scheduler, which may implemented in a CBRS provisioned SIM of the dual SIM device 1400 or may be implemented in the dual SIM device 1400, may create an inventory of services running on the dual SIM device 1400 and may determine QoS levels for each service. The SIM level task scheduler may initiate scanning of other CBSDs 1110, 1120, and 1130 and base stations 1310 and 1320 to determine signal strengths. In an implementation, the signal strength measurements may be performed by the SIM that is not being used. The signal strengths may be Reference Signal Received Power (RSRP), Reference Signal Received Quality (RSRQ), or other power measurement metrics. The SIM level task scheduler may save network connection measurements that are stronger than a current network connection plus a defined delta or offset. This may be saved by the SIM level task scheduler in the dual SIM device 1400.

The dual SIM device 1400 may, at the behest of the SIM level task scheduler, measure real-time QoS being experienced by the dual SIM device 1400. In an implementation, the measurements may be done using the connected SIM and radio. The SIM level task scheduler may then compare the measured QoS against a required QoS. The dual SIM device 1400 may remain connected to the current network, the CBRS network 1100 in this example, if the measured QoS is greater than the required QoS. In an implementation, if the measured QoS is less than a previous measurement but still above the required QoS, then more frequent measurements may be made. In an implementation, if the measured QoS has gone down for a defined number of measurements, the SIM level task scheduler may take the proactive step to initiate the process for selecting a different network connection to avoid user degradation of services.

The SIM level task scheduler may direct a second radio, for example, to connect to a second network, such as for example, the licensed spectrum network 1300 via base stations 1310 and 1320 and may share the first radio settings with the second radio. The second radio may share the first radio settings with licensed spectrum network 1300, for example. A core network 1330 of the licensed spectrum network 1300 may start fetching data from the Internet 1340 and memory/storage 1350 based on the consumed traffic in the first radio, for example. The fetched data may be cached at one of the base stations 1310 and 1320. The first radio may tell the second radio where the traffic is in terms of bits consumed so that the core network 1330 of the licensed spectrum network 1300 can send the data starting from the right location to the appropriate base station 1310 or 1320. The MME 1332 may notify one of base stations 1310 and 1320, which in turn may notify the second radio that data may be transmitted. The SIM level task scheduler may direct a processor in the dual SIM device 1400 to switch to radio two as a main data source and process the data coming from radio two and may put the first radio in measurement mode to measure available networks.

Figure 2:
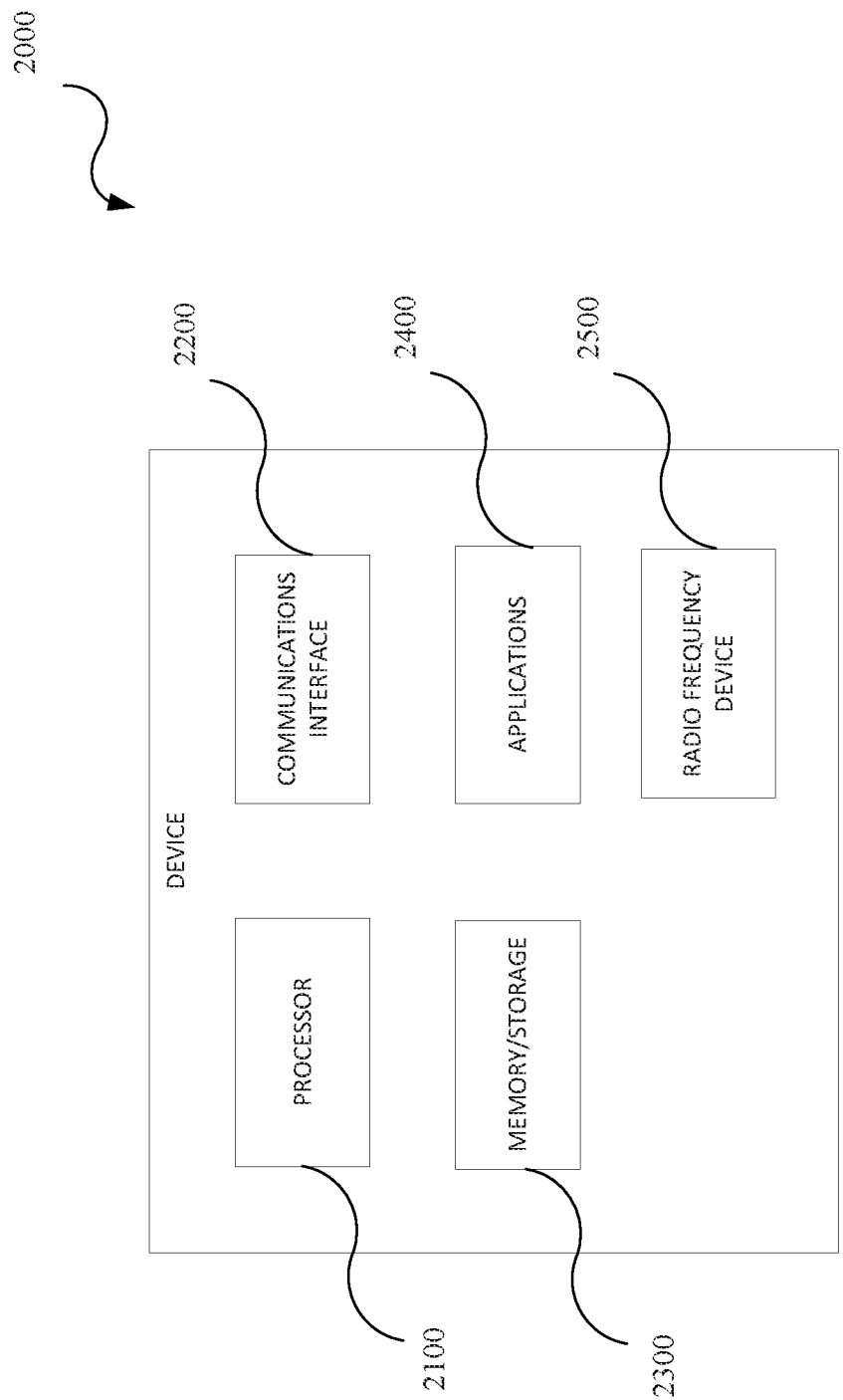
FIG. 2 is a block diagram of an example of a CBRS device (CBSD) in accordance with embodiments of this disclosure.

FIG. 2 is a block diagram of an example of a device 2000 in accordance with embodiments of this disclosure. The device 2000 may include, but is not limited to, a processor 2100, a memory/storage 2200, a communication interface 2300, applications 2400, and a radio frequency device 2500. The device 2000 may include or implement, for example, any of the CBSDs 1110, 1120, and 1130, and the base stations 1310 and 1320. In an implementation, the memory/storage 2200 may cache the data prior to sending to a new network connection. The applicable or appropriate SIM level task scheduling techniques or methods using dual SIM devices as described herein may be stored in the memory/storage 2200 and executed by the processor 2100 in cooperation with the memory/storage 3200, the communications interface 2300, the applications 2400, and the radio frequency device 3500 as appropriate. The device 2000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 3:
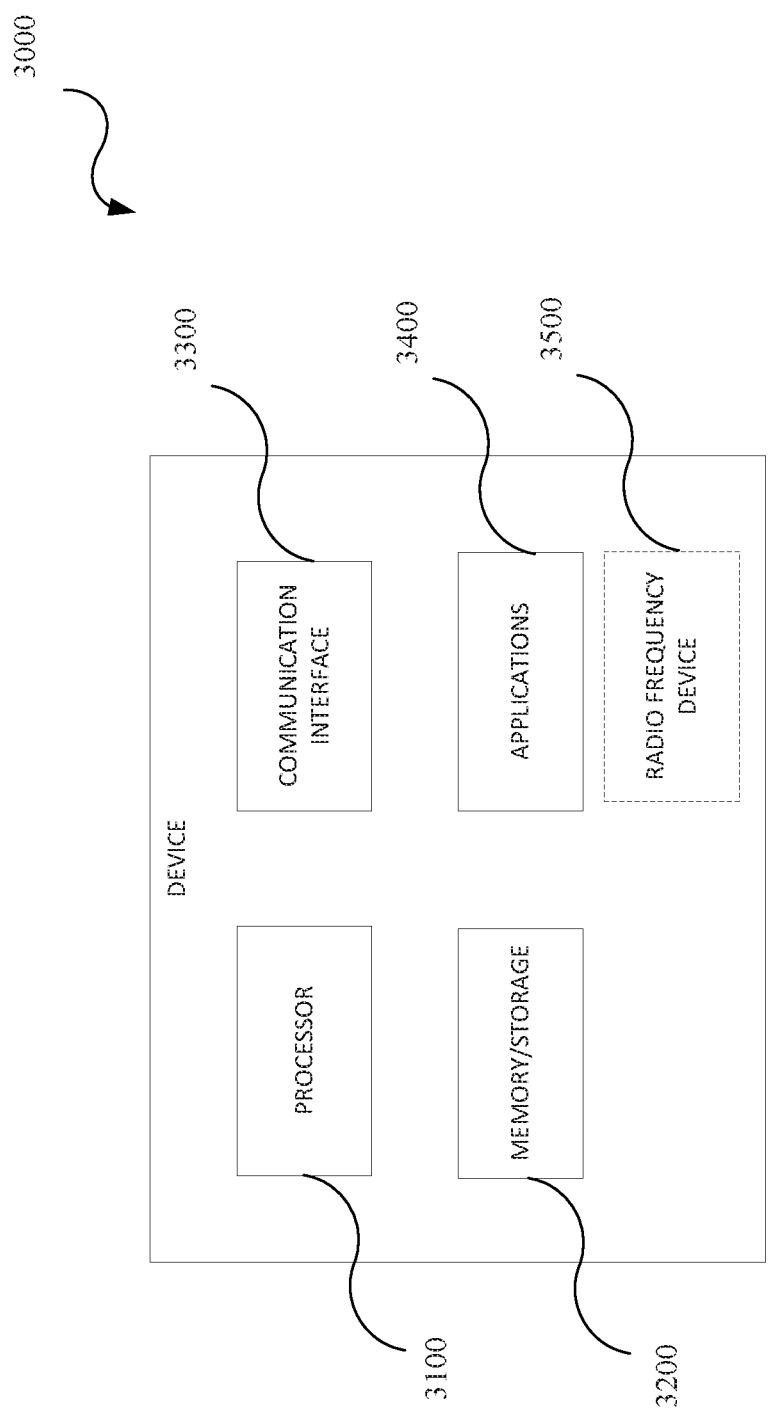
FIG. 3 is a block diagram of an example of a device in accordance with embodiments of this disclosure.

FIG. 3 is a block diagram of an example of a device 3000 in accordance with embodiments of this disclosure. The device 3000 may include, but is not limited to, a processor 3100, a memory/storage 3200, a communication interface 3300, and applications 3400. In an implementation, the device 3000 may include a radio frequency device 3500. The device 3000 may include or implement, for example, the controller 1105 and the SAS 1200. In an implementation, the memory/storage 3200 may store the interference map, spectrum allocations, and other information. The applicable or appropriate SIM level task scheduling techniques or methods using dual SIM devices as described herein may be stored in the memory/storage 3200 and executed by the processor 3100 in cooperation with the memory/storage 3200, the communications interface 3300, the applications 3400, and the radio frequency device 3500 (when applicable) as appropriate. The device 3000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 4:
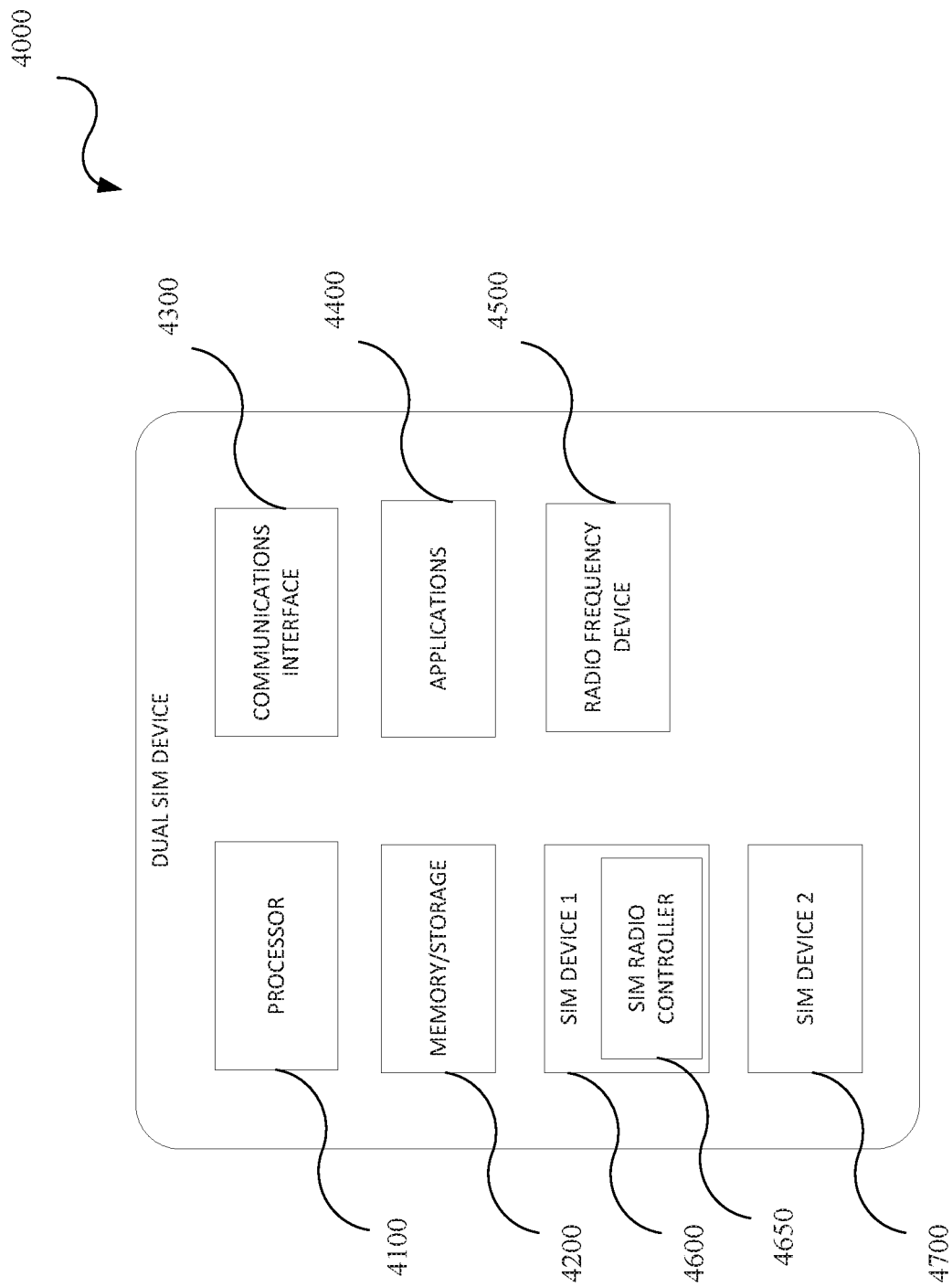
FIG. 4 is a block diagram of an example of a dual SIM device with a SIM task scheduler in accordance with embodiments of this disclosure.

FIG. 4 is a block diagram of an example of a device 4000 in accordance with embodiments of this disclosure. The device 4000 may include, but is not limited to, a processor 4100, a memory/storage 4200, a communication interface 4300, applications 4400, a radio frequency device 4500, a first SIM 4600, a SIM level task scheduler or SIM radio controller 4650, and a second SIM 4700. The device 4000 may include or implement, for example, the dual SIM device 1400. In an implementation, the memory/storage 4200 may store the required QoS, measured QoS, user settings and the like. The applicable or appropriate SIM level task scheduling techniques or methods using dual SIM devices as described herein may be stored in the memory/storage 4200 and executed by the SIM level task scheduler or SIM radio controller 4650 and the processor 4100 in cooperation with the memory/storage 4200, the communications interface 4300, the applications 4400, the radio frequency device 4500, the first SIM 4600, and the second SIM 4700 as appropriate. In an implementation, the first SIM 4600 may be provisioned for operation with unlicensed spectrum, CBRS spectrum or the like as operated by a service provider, and the second SIM 4700 may be provisioned with another MSO or the like but operated by the service provider. In an implementation, the first SIM 4600 and the second SIM 4700 may operate on a time-slotted basis with the radio frequency device 4500. In an implementation, the SIM level task scheduler or SIM radio controller 4650 may be implemented as a combination of software and firmware as part of the first SIM 4600. In an implementation, the SIM level task scheduler or SIM radio controller 4650 may be implemented as a combination of software and firmware as part of the SIM provisioned for operation with the unlicensed spectrum. In an implementation, the SIM level task scheduler or SIM radio controller 4650 may be implemented as a combination of software and firmware as part of the SIM provisioned for operation with the CBRS spectrum. The SIM level task scheduler or SIM radio controller 4650 may implement the methods and techniques described herein, such as for example, with respect to FIGS. 7 and 8. The device 4000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 5:
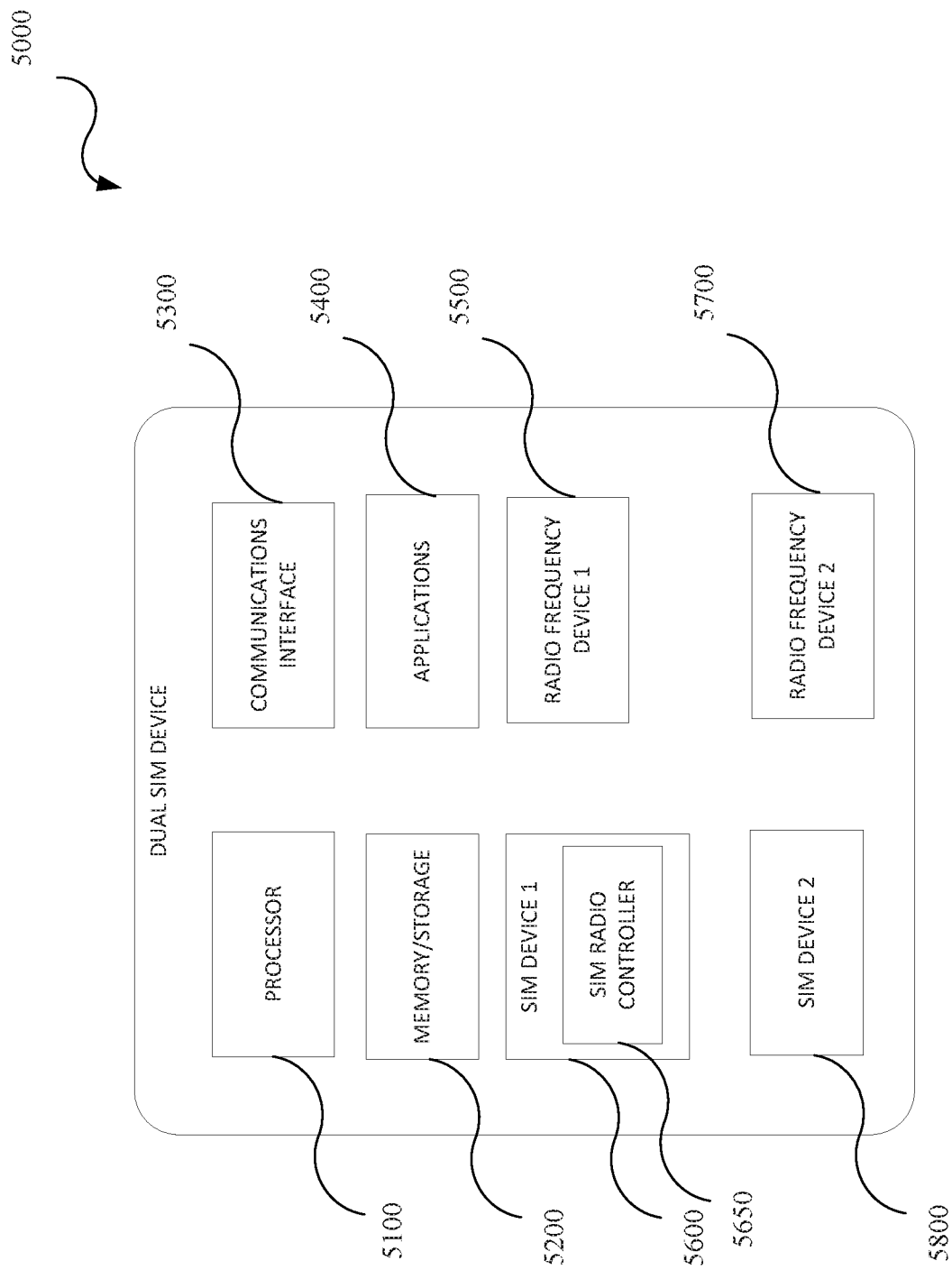
FIG. 5 is a block diagram of an example of another dual SIM device with a SIM task scheduler in accordance with embodiments of this disclosure.

FIG. 5 is a block diagram of an example of a device 5000 in accordance with embodiments of this disclosure. The device 5000 may include, but is not limited to, a processor 5100, a memory/storage 5200, a communication interface 5300, applications 5400, a radio frequency device 1 5500, a first SIM 5600, a SIM level task scheduler or SIM radio controller 5650, a radio frequency device 2 5700, and a second SIM 5800. The device 5000 may include or implement, for example, the dual SIM device 1400. In an implementation, the memory/storage 5200 may store the required QoS, measured QoS, user settings and the like. The applicable or appropriate SIM level task scheduling techniques or methods using dual SIM devices as described herein may be stored in the memory/storage 5200 and executed by the SIM level task scheduler or SIM radio controller 5650 and the processor 5100 in cooperation with the memory/storage 5200, the communications interface 5300, the applications 5400, the radio frequency device 1 5500, the first SIM 5600, the radio frequency device 2 5700, and the second SIM 5700 as appropriate. In an implementation, the first SIM 5600 may be provisioned for operation with unlicensed spectrum, CBRS spectrum or the like as operated by a service provider, and the second SIM 5700 may be provisioned with another MSO or the like but operated by the service provider. In an implementation, the first SIM 5600 may operate with the radio frequency device 1 5500 and the second SIM 5800 may operate with the radio frequency device 2 5700. In an implementation, the SIM level task scheduler or SIM radio controller 5650 may be implemented as a combination of software and firmware as part of the first SIM 5600. In an implementation, the SIM level task scheduler or SIM radio controller 5650 may be implemented as a combination of software and firmware as part of the SIM provisioned for operation with the unlicensed spectrum. In an implementation, the SIM level task scheduler or SIM radio controller 5650 may be implemented as a combination of software and firmware as part of the SIM provisioned for operation with the CBRS spectrum. The SIM level task scheduler or SIM radio controller 5650 may implement the methods and techniques described herein, such as for example, with respect to FIGS. 7 and 8. The device 5000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 6:
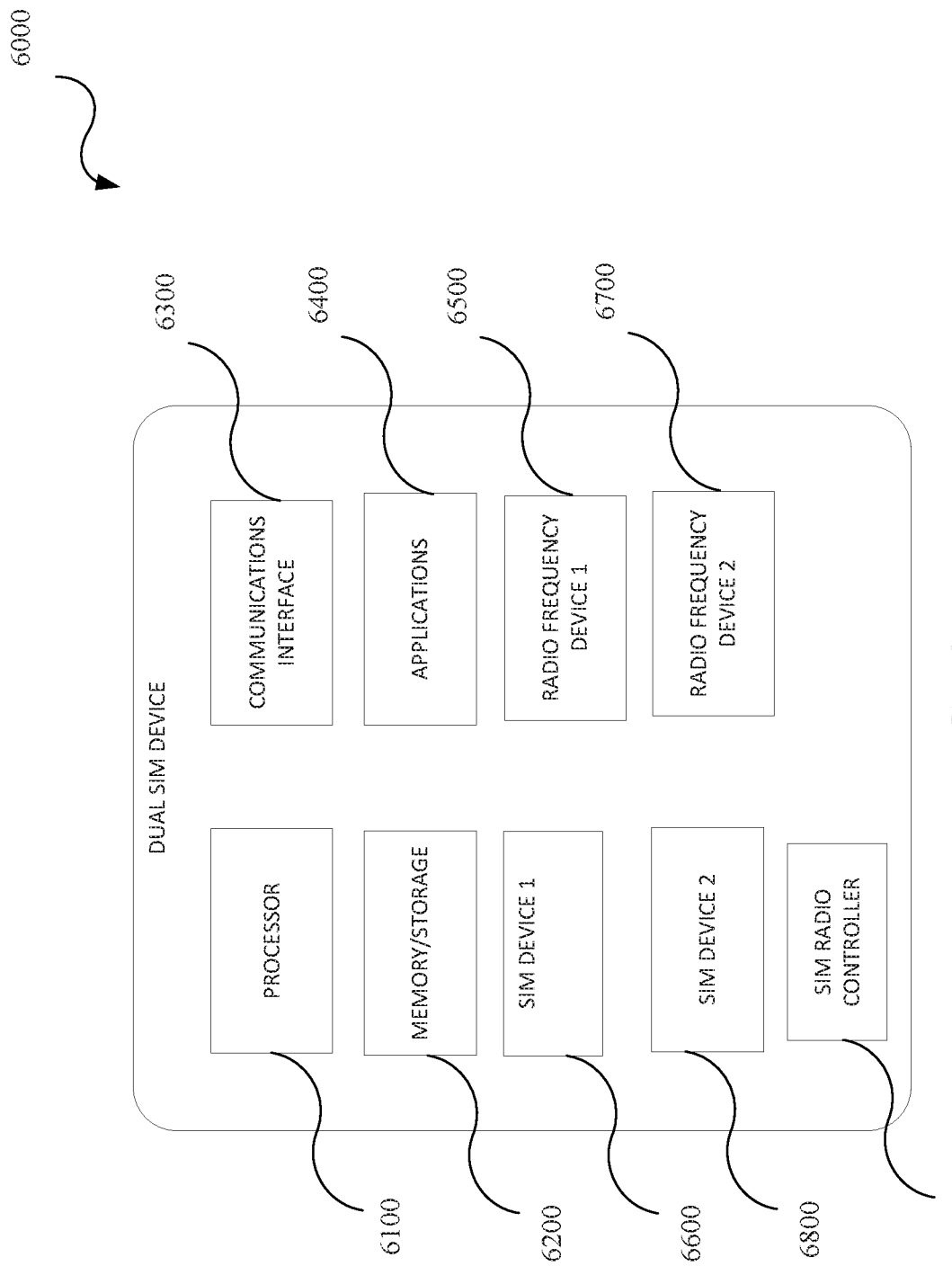
FIG. 6 is a block diagram of an example of another dual SIM device with a SIM task scheduler in accordance with embodiments of this disclosure.

FIG. 6 is a block diagram of an example of a device 6000 in accordance with embodiments of this disclosure. The device 6000 may include, but is not limited to, a processor 6100, a memory/storage 6200, a communication interface 6300, applications 6400, a radio frequency device 1 6500, a first SIM 6600, a radio frequency device 2 6700, a second SIM 6800, and a SIM level task scheduler or SIM radio controller 6900. The device 6000 may include or implement, for example, the dual SIM device 1400. In an implementation, the memory/storage 6200 may store the required QoS, measured QoS, user settings and the like. The applicable or appropriate SIM level task scheduling techniques or methods using dual SIM devices as described herein may be stored in the memory/storage 6200 and executed by the SIM level task scheduler or SIM radio controller 6900 and the processor 6100 in cooperation with the memory/storage 6200, the communications interface 6300, the applications 6400, the radio frequency device 1 6500, the first SIM 6600, the radio frequency device 2 6700, and the second SIM 6700 as appropriate. In an implementation, the first SIM 6600 may be provisioned for operation with unlicensed spectrum, CBRS spectrum or the like as operated by a service provider, and the second SIM 6700 may be provisioned with another MSO or the like but operated by the service provider. In an implementation, the first SIM 6600 may operate with the radio frequency device 1 6500 and the second SIM 6800 may operate with the radio frequency device 2 6700. In an implementation, the SIM level task scheduler or SIM radio controller 6900 may be implemented as a combination of software and firmware as part of the dual SIM device. The SIM level task scheduler or SIM radio controller 6900 may implement the methods and techniques described herein, such as for example, with respect to FIGS. 7 and 8. The device 6000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 7:
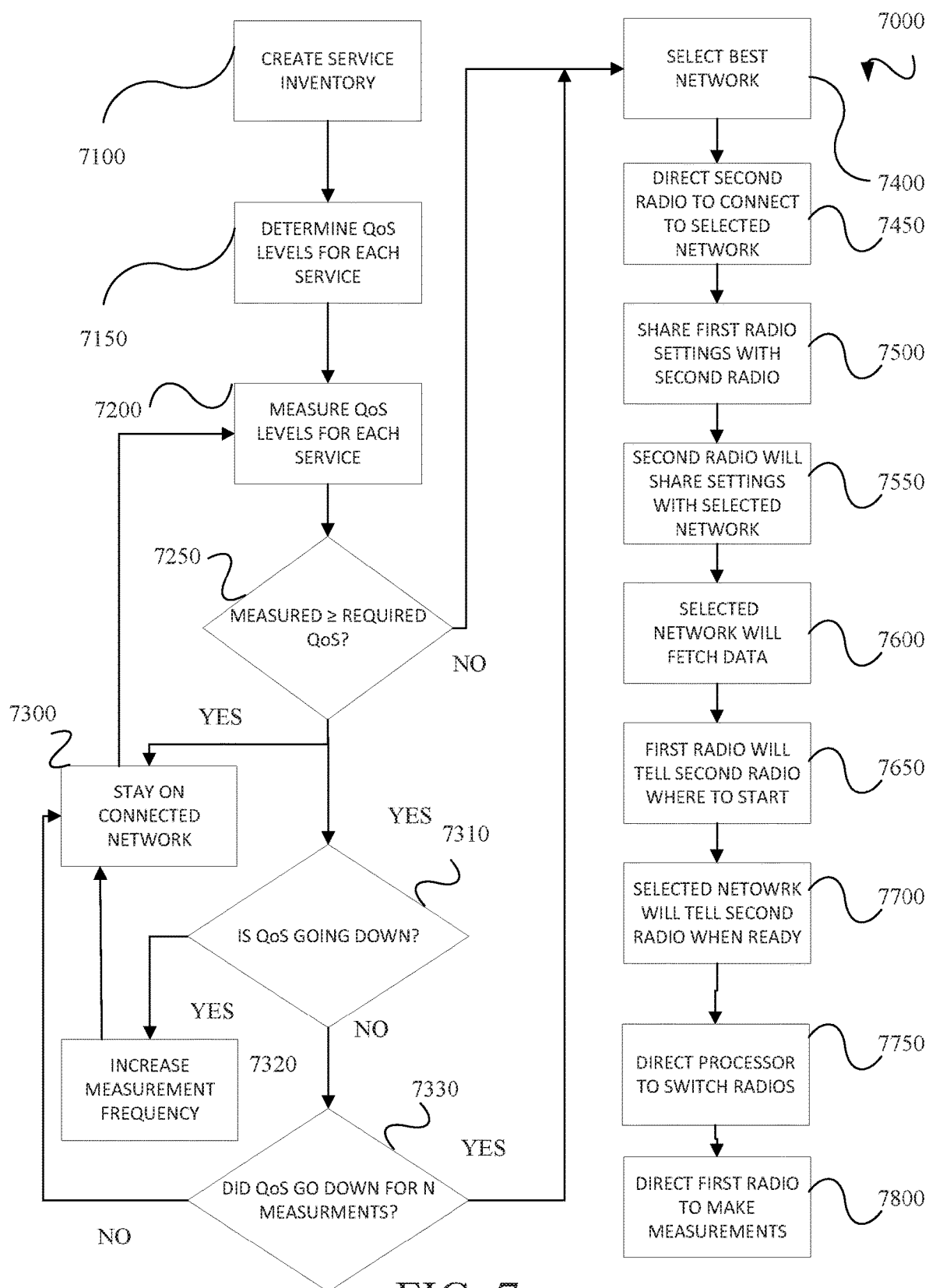
FIG. 7 is a flowchart of an example method for SIM level based task scheduling in accordance with embodiments of this disclosure.

FIG. 7 is a flowchart of an example method 7000 for SIM level task scheduling techniques or methods using dual SIM devices in accordance with embodiments of this disclosure. The method 7000 includes: creating 7100 a service inventory; determining 7150 QoS for each service; measuring 7200 QoS for each service; comparing 7250 measured QoS against required QoS; staying 7300 on connected network if QoS is okay; determining 7310 if QoS is degrading; increasing 7320 frequency of QoS measurements if degrading; determining 7330 if the QoS level has been steadily degrading; selecting 7400 best network for connection if measured QoS is below required QoS or if measured QoS has been steadily degrading; directing 7450 second radio to connect to selected network; sharing 7500 first radio settings with the second radio; sharing 7550 first radio settings with the selected network; fetching 7600 first radio data; informing 7650 second radio where to initiate data transmission; informing 7700 the second radio when the selected network is ready; directing 7750 switching from the first radio to the second radio; and directing 7800 first radio to make network measurements. For example, the technique 7000 may be implemented, as applicable and appropriate, by a CBSD such as CBSDs 1110, 1120, and 1130, and base stations 1310 and 1320 of FIG. 1, controller 1105 of FIG. 1, the SAS 1200 of FIG. 1, dual SIM devices such as the dual SIM device 1400 of FIG. 1, the dual SIM device 4000 of FIG. 4, the dual SIM device 5000 of FIG. 5, the dual SIM device 6000 of FIG. 6, the processor 2100 of FIG. 2, the processor 3100 of FIG. 3, the processor 4100 of FIG. 4, the processor 5100 of FIG. 5, the processor 6100 of FIG. 6, the SIM level task scheduler or SIM radio controller 4650 of FIG. 4, the SIM level task scheduler or SIM radio controller 5650 of FIG. 5, and the SIM level task scheduler or SIM radio controller 6900 of FIG. 6.

The method 7000 includes creating 7100 a service inventory. The creating 7100 may include connecting a dual SIM device to one of an unlicensed spectrum network or a licensed spectrum network, where the unlicensed spectrum network is operated by a service provider and the licensed spectrum network is owned or provided by a MSO and operated by the service provider. The dual SIM device may have an unlicensed spectrum provisioned SIM and a licensed spectrum provisioned SIM. The dual SIM device may further include a SIM level task scheduler or SIM radio controller which may be implemented on the unlicensed spectrum provisioned SIM or implemented on the dual SIM device. The SIM level task scheduler or SIM radio controller may be implemented as a combination of software and firmware. The SIM level task scheduler or SIM radio controller may review which services and applications are running on the dual SIM device and create a table. In addition, the SIM level task scheduler or SIM radio controller may initiate scanning of other network connections to determine signal strengths, available capacity of current network, number of users in current network, security and authentication measures used in current network, capability of dual SIM device, and like features and characteristics. This information may be saved by the SIM level task scheduler or SIM radio controller in the dual SIM device, for example, as a table or the like.

The method 7000 includes determining 7150 QoS for each service. A QoS requirement is established or determined for each service or application identified by the SIM level task scheduler or SIM radio controller and stored in the table in the dual SIM device.

The method 7000 includes measuring 7200 QoS for each service. The dual SIM device may, at the behest of the SIM level task scheduler or SIM radio controller, measure real-time QoS being experienced by the dual SIM device for the services and applications inventoried.

The method 7000 includes comparing 7250 measured QoS against required QoS. The SIM level task scheduler or SIM radio controller may compare the measured QoS against the required QoS.

The method 7000 includes staying 7300 on connected network if QoS is okay. No changes are made to the current network connection if the measured QoS meets or exceeds the required QoS.

The method 7000 includes determining 7310 if QoS is degrading. As a proactive measure, the SIM level task scheduler or SIM radio controller may compare past QoS measurements against current QoS measurements to determine if the QoS is degraded.

The method 7000 includes increasing 7320 frequency of QoS measurements if degrading and determining 7330 if the QoS level has been going down for N measurements. If the QoS is degraded but still acceptable, the SIM level task scheduler or SIM radio controller increases the frequency of QoS measurements to prevent discontinuity of service to the user. The SIM level task scheduler or SIM radio controller then determines if the QoS has been degrading over a defined time period, a defined number of measurements, or a combination thereof. If the number of times that a measured QoS is determined to be degraded is less than a defined number of times, then stay on the connected network. For example, this may be an intermittent issue and not worth switching networks.

The method 7000 includes selecting 7400 best network for connection if measured QoS is below required QoS or if measured QoS has been steadily degrading. In the event that the measured QoS is below the required QoS or the QoS is steadily degrading, the SIM level task scheduler or SIM radio controller may determine which network the dual SIM device should connect to. The SIM level task scheduler or SIM radio controller may review the stored scanning information, select a network, and determine an available capacity of the selected network, determine available capacity of the selected network, determine number of users in the selected network, determine security and authentication measures used in the selected network, and like features and characteristics. This information may be used by the SIM level task scheduler or SIM radio controller to determine which network connection to select. For example, the SIM level task scheduler or SIM radio controller may need to consider whether the selected network connection supports the capabilities of the dual SIM device, whether the security and authentication measures are of sufficient strength, and the like before initiating a switch to the selected network connection.

The method 7000 includes directing 7450 second radio to connect to selected network. Once a network connection is selected based on the power measurements and other factors, the SIM level task scheduler or SIM radio controller may direct a second radio (unconnected radio) to connect to the selected network connection while a first radio (the connected radio) is still connected to the current network connection and communicating and transferring data, for example. It is noted that during the transition or SIM switching period, the processor in the dual SIM device processes data received via the first radio and ignores data that may be received from the second radio.

The method 7000 includes sharing 7500 first radio settings with the second radio and sharing 7550 first radio settings with the selected network. The SIM level task scheduler or SIM radio controller shares the first radio settings with the second radio, which in turn shares the first radio settings with the selected network. The sharing 7550 includes the second radio negotiating with the selected network regarding the first radio settings to ensure, for example, that QoS levels will be met and the like. The settings, for example, may include amount of traffic data being consumed, type of services and applications, QoS, and the like.

The method 7000 includes fetching 7600 the first radio data, informing 7650 second radio where to initiate data transmission from, and informing 7700 the second radio when the selected network is ready. In order to provide a seamless transition, the selected network fetches or retrieves the data form the network (e.g., the Internet), caches the data at the base station, CBSD, and the like associated with the selected network connection, and learns where to start the data transmission from. The selected network informs the second radio when it is ready to transmit.

The method 7000 includes directing 7750 switching from the first radio to the second radio. The SIM level task scheduler or SIM radio controller may determine an appropriate time to switch from the first radio to the second radio. For example, this may be at an idle time when no transmissions are being made by the first radio. The SIM level task scheduler or SIM radio controller may then tell the processor in the dual SIM device to switch from the first radio to the second radio and start processing data transmissions from the second radio.

The method 7000 includes directing 7800 first radio to make network measurements. The now unconnected radio (the first radio) may then be instructed to make the power measurements while the second radio is connected to the network. In an implementation, the now unconnected radio (the first radio) may be instructed to make the QoS related power measurements while the second radio is connected to the network.

Figure 8:
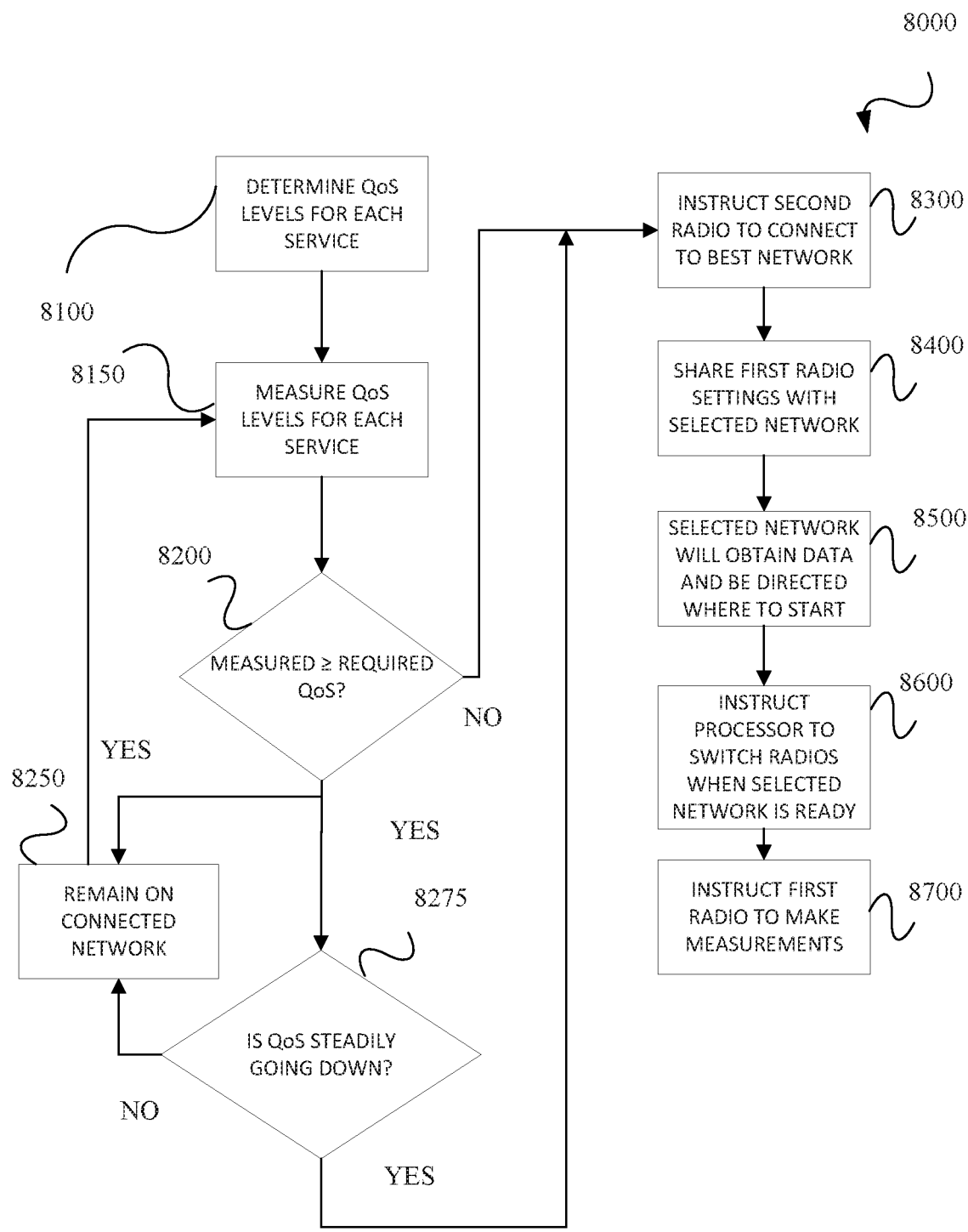
FIG. 8 is a flowchart of an example method for SIM level based task scheduling in accordance with embodiments of this disclosure.

FIG. 8 is a flowchart of an example method 8000 for SIM level task scheduling techniques or methods using dual SIM devices in accordance with embodiments of this disclosure. The method 8000 includes: determining 8100 QoS for each service running on a dual SIM device; measuring 8150 QoS for each service; checking 8200 measured QoS against required QoS; remaining 8250 on connected network if QoS is okay; determining 8275 if QoS is steadily degrading; instructing 8300 second radio to connect to a selected network; sharing 8400 first radio settings with the selected network; obtaining 8500 first radio data; instructing 8600 switch from the first radio to the second radio; and instructing 8700 first radio to make network measurements. For example, the technique 8000 may be implemented, as applicable and appropriate, by a CBSD such as CBSDs 1110, 1120, and 1130, and base stations 1310 and 1320 of FIG. 1, controller 1105 of FIG. 1, the SAS 1200 of FIG. 1, dual SIM devices such as the dual SIM device 1400 of FIG. 1, the dual SIM device 4000 of FIG. 4, the dual SIM device 5000 of FIG. 5, the dual SIM device 6000 of FIG. 6, the processor 2100 of FIG. 2, the processor 3100 of FIG. 3, the processor 4100 of FIG. 4, the processor 5100 of FIG. 5, the processor 6100 of FIG. 6, the SIM level task scheduler or SIM radio controller 4650 of FIG. 4, the SIM level task scheduler or SIM radio controller 5650 of FIG. 5, and the SIM level task scheduler or SIM radio controller 6900 of FIG. 6.

The method 8000 includes determining 8100 QoS for each service running on a dual SIM device. The determining 8100 may include connecting one SIM and a radio of a dual SIM device to one of an unlicensed spectrum network or a licensed spectrum network, where the unlicensed spectrum network is operated by a service provider and the licensed spectrum network is owned or provided by a MSO and operated by the service provider. The dual SIM device may have an unlicensed spectrum provisioned SIM and a licensed spectrum provisioned SIM. The dual SIM device may further include a SIM level task scheduler or SIM radio controller which may be implemented on the unlicensed spectrum provisioned SIM or implemented on the dual SIM device. The SIM level task scheduler or SIM radio controller may be implemented as a combination of software and firmware. The SIM level task scheduler or SIM radio controller may initiate scanning of other network connections to determine signal strengths, available capacity of current network, number of users in current network, security and authentication measures used in current network, capability of dual SIM device, and like features and characteristics. In an implementation, the scanning may be performed by a non-connected SIM and radio in the dual SIM device. This information may be saved by the SIM level task scheduler or SIM radio controller in the dual SIM device, for example, as a table or the like. The SIM level task scheduler or SIM radio controller may review which services and applications are running on the dual SIM device and create an inventory list and may determine a required QoS for each service.

The method 8000 includes measuring 8150 QoS for each service. The dual SIM device may, at the behest of the SIM level task scheduler or SIM radio controller, measure realtime QoS being experienced by the dual SIM device for the services and applications inventoried.

The method 8000 includes checking 8200 measured QoS against required QoS. The SIM level task scheduler or SIM radio controller may compare the measured QoS against the required QoS.

The method 8000 includes remaining 8250 on a connected network if the measured QoS is okay. No changes are made to the current network connection if the measured QoS meets or exceeds the required QoS.

The method 8000 includes determining 8275 if QoS is steadily degrading. As a proactive measure, the SIM level task scheduler or SIM radio controller may compare past QoS measurements against current QoS measurements to determine if the QoS is degrading over a defined period of time, for a defined number of measurements, or a combination thereof. The method 8275 includes increasing the frequency of QoS measurements to determine, for example, how fast the QoS is degrading.

The method 8000 includes instructing 8300 a non-connected radio to connect to a selected network. The instructing 8300 includes selecting a network for connection if the measured QoS is below the required QoS or if the measured QoS has been steadily degrading. The SIM level task scheduler or SIM radio controller may review the stored scanning information, select a network, and determine an available capacity of the selected network, determine available capacity of the selected network, determine number of users in the selected network, determine security and authentication measures used in the selected network, and like features and characteristics. This information may be used by the SIM level task scheduler or SIM radio controller to determine which network connection to select. For example, the SIM level task scheduler or SIM radio controller may need to consider whether the selected network connection supports the capabilities of the dual SIM device, whether the security and authentication measures are of sufficient strength, and the like before initiating a switch to the selected network connection. The SIM level task scheduler or SIM radio controller may then instruct the non-connected radio to connect to the selected network connection while the connected radio is still connected to the current network connection and communicating and transferring data, for example. It is noted that during the transition or SIM switching period, the processor in the dual SIM device processes data received via the first radio and ignores data that may be received from the second radio.

The method 8000 includes sharing 8400 first radio settings with the selected network. To provide a seamless transition, the SIM level task scheduler or SIM radio controller may share the connected radio settings with the non-connected radio, which in turn shares it with the selected network. The sharing 8400 includes the non-connected radio negotiating with the selected network regarding the connected radio settings to ensure, for example, that QoS levels will be met and the like. The settings, for example, may include amount of traffic data being consumed, type of services and applications, QoS, and the like.

The method 8000 includes obtaining 8500 the connected radio data and informing the non-connected radio where to start data transmissions from. In order to provide a seamless transition, the selected network fetches or retrieves the data form the network (e.g., the Internet), caches the data at the base station, CBSD, and the like associated with the selected network connection, and learns where to start the data transmission from.

The method 8000 includes directing 8600 switching from the connected radio to the non-connected radio when the selected network indicates that it is ready. The SIM level task scheduler or SIM radio controller may determine an appropriate time to switch from the first radio to the second radio. For example, this may be at an idle time when no transmissions are being made by the first radio. The SIM level task scheduler or SIM radio controller may then tell the processor in the dual SIM device to switch from the connected radio to the non-connected radio and start processing data transmissions from the second radio.

The method 8000 includes directing 8700 the now non-connected radio to make network measurements. The now non-connected radio may make the power measurements while the now connected radio is connected to the network. In an implementation, the now unconnected radio (the first radio) may be instructed to make the QoS related power measurements while the second radio is connected to the network.

In general, a method for task scheduling with a subscriber identification module (SIM) radio controller in a dual SIM device includes determining, by a SIM radio controller, quality of service (QoS) levels for each service running on a dual SIM device, where a first SIM and first radio is connected to a first network of one of an unlicensed spectrum network or a licensed spectrum network, both the unlicensed spectrum network and the licensed spectrum network being operated by a service provider. A second SIM and second radio scans available network connections operated by the service provider. The dual SIM device, a QoS level for each service and the SIM radio controller checks the measured QoS levels against required QoS levels. The dual SIM device remains on the first network if the measured QoS levels at least meet the required QoS levels. The SIM radio controller determines if the measured QoS levels are steadily degrading. The SIM radio controller instructs the second radio to connect to a selected network from the available networks when the measured QoS levels are steadily degrading or the measured QoS levels are below the required QoS levels. The dual SIM device shares the first radio settings with the selected network. The selected network obtains the first radio data. The SIM radio controller instructs a processor to switch from the first radio to the second radio. In an implementation, a processor continues to process data from the first radio and ignores data from the second radio until receipt of an instruction to switch to the second radio by the SIM radio controller. In an implementation, the SIM radio controller inventories the services and applications running on the dual SIM device. In an implementation, the SIM radio controller checks a frequency of QoS measurements when the measured QoS levels are degrading. In an implementation, the SIM radio controller determines a number of times that a degraded QoS level is measured. In an implementation, the dual SIM device remains on the first network if the number of times is less than a defined number of times. In an implementation, the SIM radio controller determines how fast a measured QoS level is degrading. In an implementation, the SIM radio controller determines the selected network based on signal strength, available capacity of the selected network, number of users in the selected network, security and authentication measures used in the selected network, and capability of the dual SIM device. In an implementation, the second radio negotiates with the selected network, the first radio settings and required QoS levels for the services and applications. In an implementation, the second radio instructs the selected network where to start data transmissions. In an implementation, the SIM radio controller instructs when to start data transmissions between the second radio and the selected network. In an implementation, the SIM radio controller instructs the first radio to scan for available network connections.

In general, a dual subscriber identification module (SIM) device includes a shared spectrum SIM connected to a first radio, the shared spectrum SIM including a SIM radio controller, and a licensed spectrum SIM connected to a second radio, where the shared spectrum SIM is provisioned for operation on a shared spectrum network and the licensed spectrum SIM is provisioned for operation on a licensed spectrum network, both the shared spectrum network and the licensed spectrum network being operated by a same service provider. The dual SIM device further includes a processor connected to the first radio, the second radio, the shared spectrum SIM, and the licensed spectrum SIM. When the dual SIM device is connected to a network, the SIM radio controller is configured to inventory services and applications operating on the dual SIM device, obtain quality of service (QoS) requirements for each service and application, initiate signal strength measurements of network connections operated by the service provider by whichever of the first radio and the second radio is unconnected to the network, initiate QoS measurements for the services and applications, stay on a connected network connection if measured QoS levels at least meet the QoS requirements, direct an unconnected radio to connect to a network selected from the available networks when the measured QoS levels are in at least a steady decline, send the connected radio settings to the selected network, and direct the processor to switch to the unconnected radio from the connected radio when the selected network has indicated a readiness to transmit. In an implementation, a processor is configured to ignore data from the unconnected radio until SIM switching is complete. In an implementation, the SIM radio controller is configured to increase QoS measurement rate when degradation is determined. In an implementation, the SIM radio controller is configured to determine frequency of degraded QoS measurements and stay on the connected network if frequency is below a defined threshold. In an implementation, the selected network is based on signal strength, available capacity of the selected network, number of users in the selected network, security and authentication measures used in the selected network, and capability of the dual SIM device. In an implementation, the SIM radio controller is configured to direct the now unconnected radio to scan for available network connections.

In general, a dual subscriber identification module (SIM) device includes a shared spectrum SIM connected to a first radio, a licensed spectrum SIM connected to a second radio, where the shared spectrum SIM is configured to run on a shared spectrum network and the licensed spectrum SIM is configured to run on a licensed spectrum network, both the shared spectrum network and the licensed spectrum network being operated by a same service provider, a processor connected to the first radio, the second radio, the unlicensed spectrum SIM, and the licensed spectrum SIM, and q SIM radio controller connected to the processor, the first radio, the second radio, the shared spectrum SIM, and the licensed spectrum SIM. When the dual SIM device is connected to a network, the SIM radio controller is configured to obtain quality of service (QoS) requirements for each service and application running on the dual SIM device, initiate signal strength scans of network connections operated by the service provider by whichever of the first radio and the second radio is unconnected to the network, stay on a connected network connection if measured QoS levels at least meet the QoS requirements, send connected radio settings to a selected network when the measured QoS levels are declining, wherein the selected network is based on signal strength, available capacity of the selected network, number of users in the selected network, security and authentication measures used in the selected network, and capability of the dual SIM device, direct the processor to switch to the unconnected radio from the connected radio when the selected network has indicated transmission readiness, and direct the now unconnected radio to scan for available network connections. In an implementation, the processor is configured to ignore data from the unconnected radio until transition is complete. In an implementation, the SIM radio controller is configured to determine frequency of degraded QoS measurements, increase QoS measurement rate when degradation is determined, and stay on the connected network if frequency is below a defined threshold.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for task scheduling with a subscriber identification module (SIM) radio controller in a dual SIM device, the method comprising:
    determining, by a SIM radio controller, quality of service (QoS) levels for each service running on a dual SIM device, wherein a first SIM and first radio is connected to a first network of one of an unlicensed spectrum network or a licensed spectrum network, both the unlicensed spectrum network and the licensed spectrum network being operated by a service provider;
    scanning, by a second SIM and second radio, available network connections operated by the service provider;
    measuring, by the dual SIM device, a QoS level for each service;
    checking, by the SIM radio controller, measured QoS levels against required QoS levels; and
    remaining on the first network when the measured QoS levels at least meet the required QoS levels.

2. The method of claim 1, wherein a processor continues to process data from the first radio and ignores data from the second radio until receipt of an instruction to switch to the second radio by the SIM radio controller.

3. The method of claim 1, the method further comprising:
    inventorying, by the SIM radio controller, services and applications running on the dual SIM device.

4. The method of claim 1, the method further comprising:
    determining, by the SIM radio controller, when the measured QoS levels are steadily degrading; and
    increasing, by the SIM radio controller, a frequency of QoS measurements when the measured QoS levels are degrading.

5. The method of claim 4, the method further comprising:
    determining, by the SIM radio controller, a number of times that a degraded QoS level is measured; and
    remaining on the first network when the number of times is less than a defined number of times.

6. The method of claim 4, the method further comprising:
    determining, by the SIM radio controller, how fast a measured QoS level is degrading.

7. The method of claim 1, the method further comprising:
    selecting, by the SIM radio controller, the selected network based on signal strength, available capacity of the selected network, number of users in the selected network, security and authentication measures used in the selected network, and capability of the dual SIM device.

8. The method of claim 1, the method further comprising:
    negotiating, by the second radio with the selected network, the first radio settings and required QoS levels for the services and applications.

9. The method of claim 8, the method further comprising:
    sharing, by the dual SIM device, the first radio settings with the selected network.

10. The method of claim 9, the method further comprising:
    obtaining, by the selected network, the first radio data.

11. The method of claim 1, the method further comprising:
    instructing, by the second radio to the selected network, where to start data transmissions.

12. The method of claim 1, the method further comprising:
    instructing, by the SIM radio controller, when to start data transmissions between the second radio and the selected network.

13. The method of claim 1, the method further comprising:
    instructing, by the SIM radio controller, the first radio to scan for available network connections.

14. The method of claim 1, the method further comprising:
    instructing, by the SIM radio controller, the second radio to connect to a selected network from the available networks when the measured QoS levels are steadily degrading or the measured QoS levels are below the required QoS levels; and
    instructing, by the SIM radio controller, to switch from the first radio to the second radio.

15. A dual subscriber identification module (SIM) device, the device comprising:
    a shared spectrum SIM connected to a first radio;
    a licensed spectrum SIM connected to a second radio, wherein the shared spectrum SIM is configured to run on a shared spectrum network and the licensed spectrum SIM is configured to run on a licensed spectrum network, both the shared spectrum network and the licensed spectrum network being operated by a same service provider; and
    a processor connected to the first radio, the second radio, the unlicensed spectrum SIM, and the licensed spectrum SIM; and
    a SIM radio controller connected to the processor, the first radio, the second radio, the shared spectrum SIM, and the licensed spectrum SIM,
    wherein, when the dual SIM device is connected to a network, the SIM radio controller is configured to:
        initiate quality of service (QoS) measurements of network connections operated by the service provider by whichever of the first radio and the second radio is unconnected to the network; and
        stay on a connected network connection when measured QoS levels at least meet the QoS requirements.

16. The dual SIM device of claim 15, wherein the SIM radio controller is configured to:

send connected radio settings to a selected network when the measured QoS levels are declining, wherein the selected network is based on signal strength, available capacity of the selected network, number of users in the selected network, security and authentication measures used in the selected network, and capability of the dual SIM device; and direct the processor to switch to the unconnected radio from the connected radio when the selected network has indicated transmission readiness; and direct the now unconnected radio to scan for available network connections.

17. The dual SIM device of claim 15, wherein the SIM radio controller is configured to:

determine frequency of degraded QoS measurements;

increase QoS measurement rate when degradation is determined; and stay on the connected network when frequency is below a defined threshold.

18. The dual SIM device of claim 17, wherein the SIM radio controller is configured to:

determine a number of times that a degraded QoS level is measured; and remain on the first network when the number of times is less than a defined number of times.

19. The dual SIM device of claim 15, wherein the SIM radio controller is configured to:

instruct when to start data transmissions between the second radio and the selected network.

20. The dual SIM device of claim 15, wherein the second radio is configured to:

instruct the selected network where to start data transmissions.

* * * * *